United States Patent [19]
Sudoff

[11] Patent Number: 5,872,410
[45] Date of Patent: Feb. 16, 1999

[54] MOTOR TERMINAL AND CAPACITOR BOX

[75] Inventor: Douglas H. Sudoff, Madison, Ind.

[73] Assignee: Reliance Electric Industrial Company, Cleveland, Ohio

[21] Appl. No.: 732,737

[22] Filed: Oct. 18, 1996

[51] Int. Cl.⁶ .................................................. H02K 11/00
[52] U.S. Cl. .......................................... 310/68 R; 310/71
[58] Field of Search .................................. 310/71, 89, 42, 310/68 R, 72; 174/17 R, 17.08, 17 CT, 18, 19, 50, 50.52, 50.54, 52.1, 52.4, 54, 65 R; 439/638, 532, 550

[56] References Cited

U.S. PATENT DOCUMENTS

| | | | |
|---|---|---|---|
| 1,646,962 | 10/1927 | Hillix | 310/71 |
| 2,094,386 | 9/1937 | Veinott | 310/71 |
| 2,295,916 | 9/1942 | Schiff | 310/68 R |
| 2,683,824 | 7/1954 | Carville et al. | 310/72 |
| 3,131,331 | 4/1964 | Ray | 310/71 |
| 4,841,288 | 6/1989 | Addicks | 340/690 |
| 4,851,725 | 7/1989 | Keck | 310/71 |
| 5,006,742 | 4/1991 | Strobl et al. | 310/88 |
| 5,010,265 | 4/1991 | Tanaka et al. | 310/88 |
| 5,192,888 | 3/1993 | Fleer | 310/71 |
| 5,306,973 | 4/1994 | Butcher et al. | 310/68 C |
| 5,391,837 | 2/1995 | Carey | 174/50 |
| 5,430,931 | 7/1995 | Fisher et al. | 29/596 |
| 5,491,370 | 2/1996 | Schneider et al. | 310/68 R |

*Primary Examiner*—Clayton LaBalle
*Attorney, Agent, or Firm*—Michael E. Hudzinski; John M. Miller; John J. Horn

[57] ABSTRACT

A terminal and capacitor box is provided for mounting directly onto a generally cylindrical surface of an electric induction motor housing. The terminal box includes a generally rectangular body member adapted to receive a pair of capacitors therein. The body member includes a substantially planar deck surface, a first pair of substantially rectangular opposing sidewalls, and a second pair of opposing sidewalls. The second pair of sidewalls have a curved bottom edge preselectively contoured to conform to the curved surface of the electric motor housing. In addition to the above, the terminal box includes a torsional spring member for engaging the pair of capacitors and holding the pair of capacitors in place against the planar deck surface of the rectangular body member and between the sidewalls regardless of the orientation of the terminal box. Thus facilitating the manufacturing process by rendering the box less sensitive to rough handling and more ameanable to processing as a subassembly. A successive set of subassemblies are formed by attaching the capacitors and then the electrical connector to the box and then lastly pre-wiring certain connections within the box. Together, the assembled unit is available for later attachment to an electric motor.

20 Claims, 7 Drawing Sheets

MOTOR TERMINAL AND CAPACITOR BOX

BACKGROUND OF THE INVENTION

1. Field of the Invention

The present invention pertains to the art of electrical junction boxes and more particularly to conduit boxes for use in allowing access to wiring for apparatus such as split capacitor induction motors. The box is adapted to hold in place a pair of capacitors and an industry standard electrical connector for manufacturing a motor conduit box subassembly having a substantial portion of the electrical connections completed before the box is mated to a motor.

2. Description of the Related Art

FIG. 1 illustrates one example of a prior art conventional split capacitor induction motor 1 including a pair of separately housed capacitors 2, 3, a motor lead wire bundle 4, and an electrical connector 5. This prior art motor configuration was difficult to manufacture due in part to the separately housed capacitors 2, 3 and the location of the lead wire bundle 4 on the motor housing. As would be appreciated by those skilled in the art, the electrical connections to the motor windings (not shown) necessitates at least three access holes in the motor housing, one at each capacitor and one for the lead wire bundle. Each of the access holes in turn requires a strain relief.

Further, each capacitor housing on the housing complicates the manufacturing process by requiring a gasket to prevent water or other moisture from entering the motor. Also, special care must be taken during the process of routing the lead wires from the windings to the capacitors and lead bundle.

The lead bundle is a problem during the manufacture of the motor in that it must be taped over or otherwise protected before the motor is painted. Also, the lead bundle must be handled carefully when the motor is placed into a carton for shipment in order to avoid damage thereto.

Lastly, the configuration shown in the FIGURE proves unweildly during field installation of the motor in that two hands are normally required to grasp and attach the electrical connector 5 of the motor to the electrical connector (not shown) at the customers site of installation.

SUMMARY OF THE INVENTION

Accordingly, it is an object of the present invention to provide a conduit box which overcomes the above described problems found in the prior art and which is adapted to facilitate the process of manufacturing the motor, storing and shipping the motor, and field installing the motor.

It is a primary object of the present invention to provide an improved motor conduit box of a substantially unitary construction, preferably in the form of a single injection molded part adapted to house a set of capacitors and an electrical connector therein.

To these ends, according to the present invention, there is provided a terminal box for mounting directly on a generally cylindrical surface of an electric induction motor housing. The terminal box comprises a generally rectangular body member adapted to receive a pair of capacitors therein. The body member includes a substantially planar deck surface, a first pair of substantially rectangular opposing sidewalls, and a second pair of opposing sidewalls. The second pair of sidewalls have a curved bottom edge preselectively contoured to conform to the curved surface of the electric motor housing. In addition to the above, the terminal box includes a torsional spring member for engaging the pair of capacitors and holding the pair of capacitors in place against the planar deck surface of the rectangular body member and between the sidewalls regardless of the orientation of the terminal box. The above described construction facilitates the manufacturing process by rendering the box less sensitive to rough handling and more ameanable to processing as a subassembly. The flat outer surface of one side of the box is particularly useful for motor name plate information or other indicia of origin or instructional data such as a wiring connection diagram.

BRIEF DESCRIPTION OF THE DRAWINGS

The invention may take physical form in certain parts and arrangements of parts, the preferred embodiment of which will be described in detail in this specification and illustrated in the accompanying drawings which form a part hereof and wherein.

DETAILED DESCRIPTION OF THE PREFERRED EMBODIMENT

Figure 1:
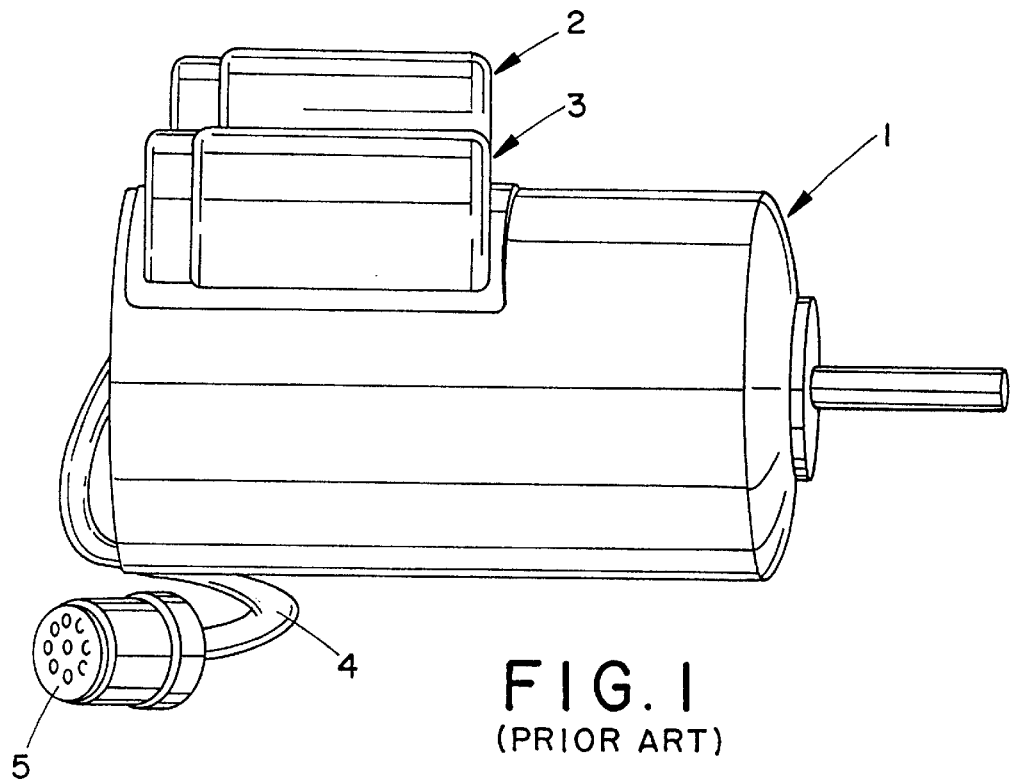
FIG. 1 is a perspective view of a prior art box arrangement on a split capacitor induction motor.
Figure 2:
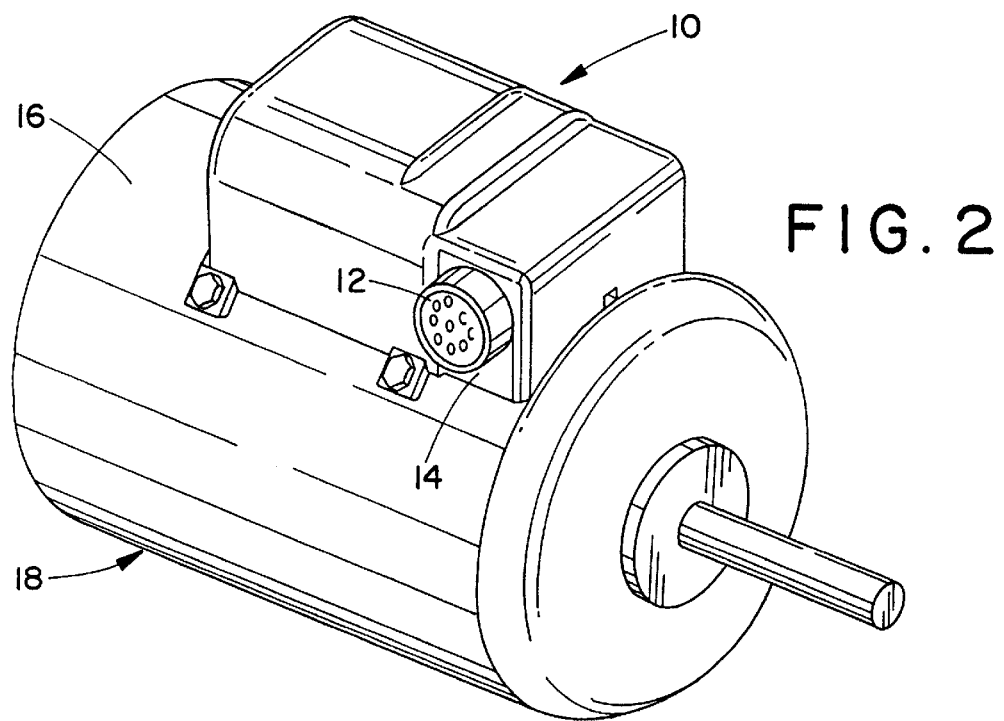
FIG. 2 is a perspective view of the capacitor and conduit box according to the present invention.
Figure 3:
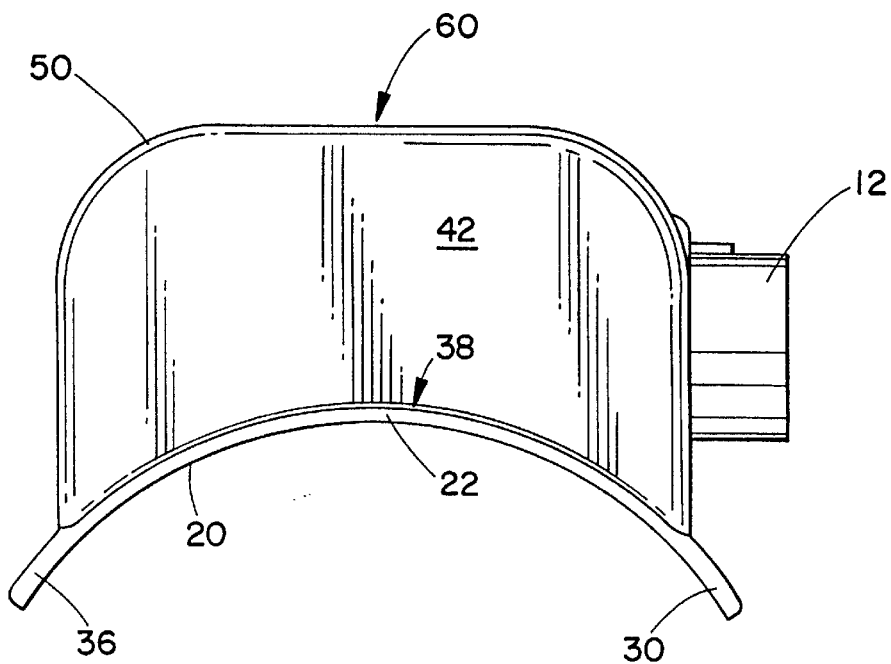
FIG. 3 is a front view of the conduit box of FIG. 2.
Figure 4:
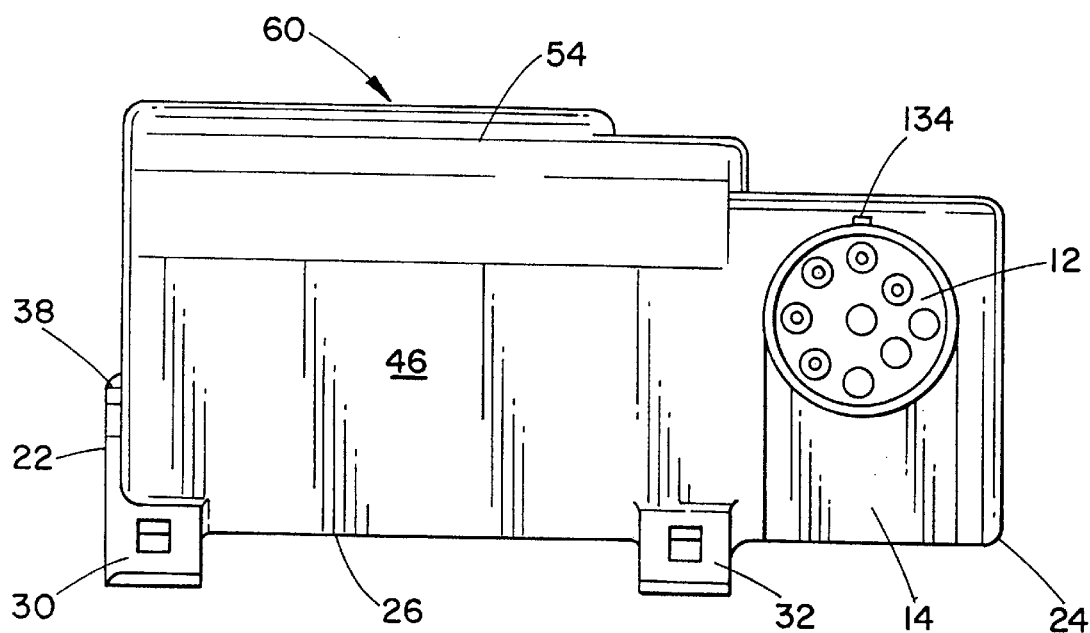
FIG. 4 is a left side view of the conduit box of FIG. 2.
Figure 5:
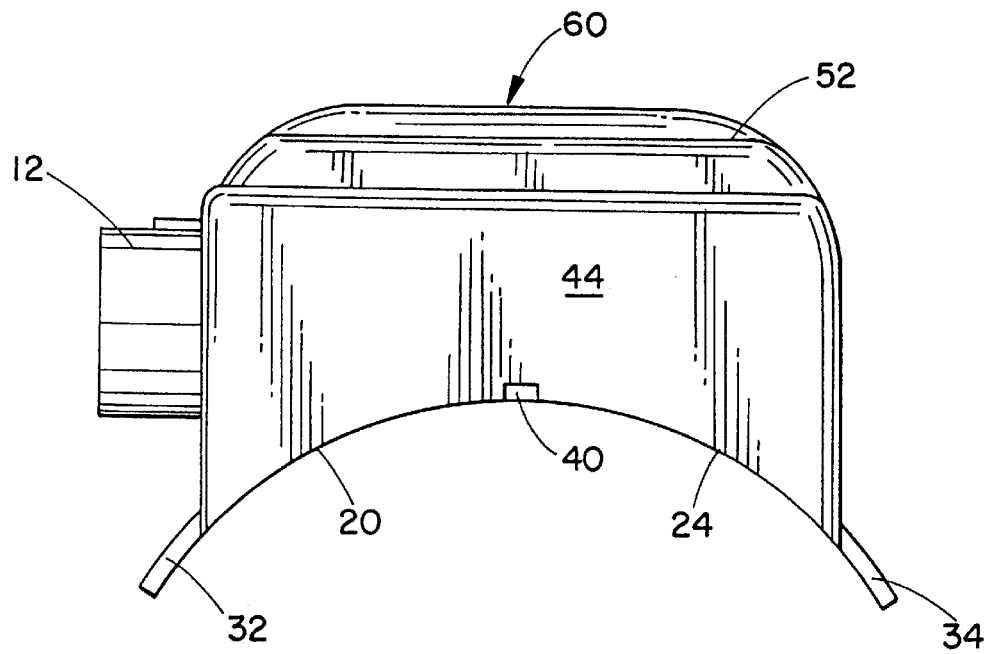
FIG. 5 is a rear view of the conduit box of FIG. 2.
Figure 6:
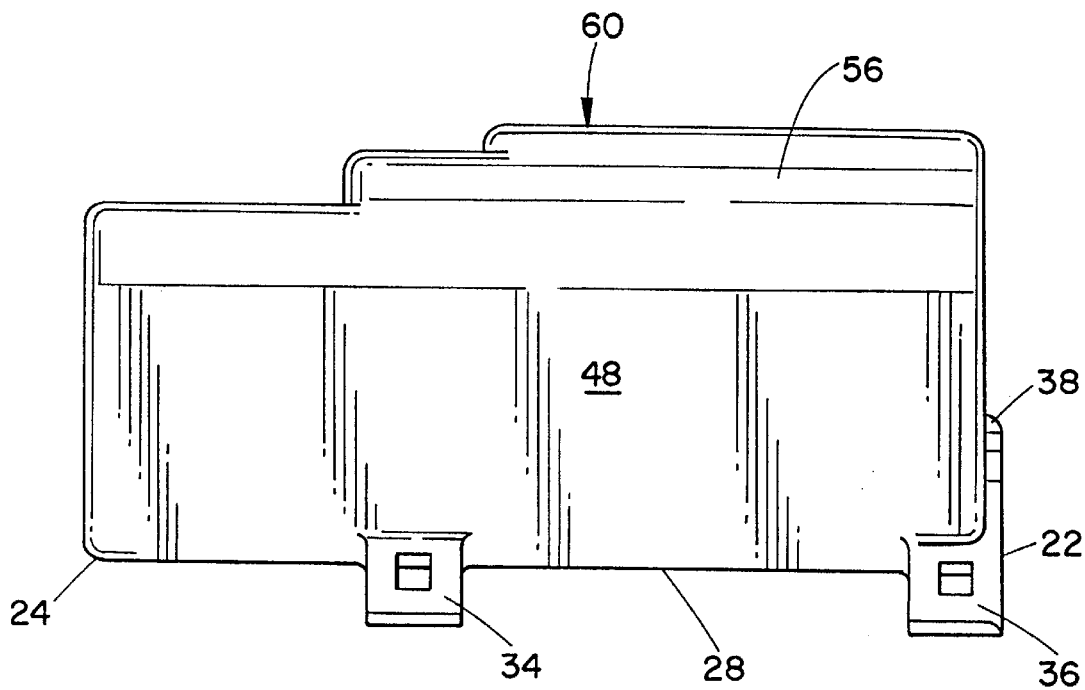
FIG. 6 is a right side view of the conduit box of FIG. 2.

With reference now to the DRAWINGS wherein showings are for purposes of illustrating the preferred embodiment of the invention only and not for the purposes of limiting same, FIGS. 2 through 9 illustrate the unitary conduit box of the present invention being generally identified by the reference numeral 10. The conduit box 10 is shown with its associated connector 12 and connector locking member 14 mounted on a casing 16 of a motor 18.

The conduit box 10 is of a simple, substantially unitary or one piece construction, as shown and is generally rectangular in shape but includes a curved bottom 20. The curved bottom 20 has a front edge 22, a rear edge 24, and opposite side edges 26, 28. The front and rear edges 22, 24 extend in parallel archs from the first side edge 26 to the second side edge 28 of the curved bottom 20. The curved bottom 20 is shaped to conform to the cylindrical casing 16 of the motor 14 on which the conduit box 10 is mounted. This permits the terminal box to be mounted directly on the curved surface of the cylindrical casing 12 of the motor 14 eliminating the need for an adapter apparatus.

To facilitate the mounting of the conduit box 10 to the motor casing 16, each of the side edges 26, 28 are provided with a pair of mounting tabs 30, 32 and 34, 36 respectively. The first pair of mounting tabs 30, 32 are spaced apart along the first side edge 26. Similarly, the second pair of mounting tabs 34, 36 are spaced apart along the second edge 28. When the conduit box 10 is mounted on the motor 18 as shown, a specialized bead area 38 molded into the first edge 22 prevents water, such as from condensation on the motor, from entering into the conduit box. In the preferred embodiment illustrated, the bead area 38 is provided only on the front edge 22 because it is intended that the motor is to be applied in a vertical orientation. That is, the output shaft of the motor will be directed upwardly in actual application. This being the case, the bead area 38 causes water such as may be used during a motor "wash down" process to flow around the conduit box 10 rather than entering into the box structure. In the event, however, that any moisture does enter into the conduit box 10, a drain appature 40 is provided along the rear edge 24 as shown. Thereby, any moisture buildup within the conduit box 10 may be easily purged therefrom. It is to be noted however, that for certain applications, it may be desirable to provide a construction such as the bead area 38 on all four edges 22–28 of the conduit box.

With particular reference now to FIGS. 3 through 6, the conduit box 10 has a substantially rectangular sidewall 42 which extends vertically upwardly from the front edge 22 of the curved bottom 20. The second substantially rectangular sidewall 44 extends vertically upwardly from rear edge 24 of the curved bottom 20. A third substantially rectangular sidewall 46 extends vertically upwardly from the first side edge 26 of the curved bottom 20. Lastly, a fourth substantially rectangular sidewall 48 extends vertically upwardly from the second side edge 28 of the curved bottom 20. As shown, the sidewalls 42, 44 are not true rectangles in that their lower edges 22, 24 are curved. Each of the sidewalls 42–48 has, respectively, curved top edges 50, 52, 54 and 56. The curved top edges 50, 52, 54 and 56 generally all meet at a substantially flat rectangular top deck surface 60. As illustrated, the top edges 54, 56 on the third and fourth sidewalls 46, 48 have a more gradual curve than the top edges 50, 52 on the first and second sidewalls 42, 44. More particularly, the top edges 54, 56 on the third and fourth sidewalls 46, 48 are curved in a fashion to generally match the shape and size of the pair of capacitors to be contained within the conduit box 10. The pair of capacitors are shown lodged in the box in FIG. 9 and will be described in greater detail below.

Figure 7:
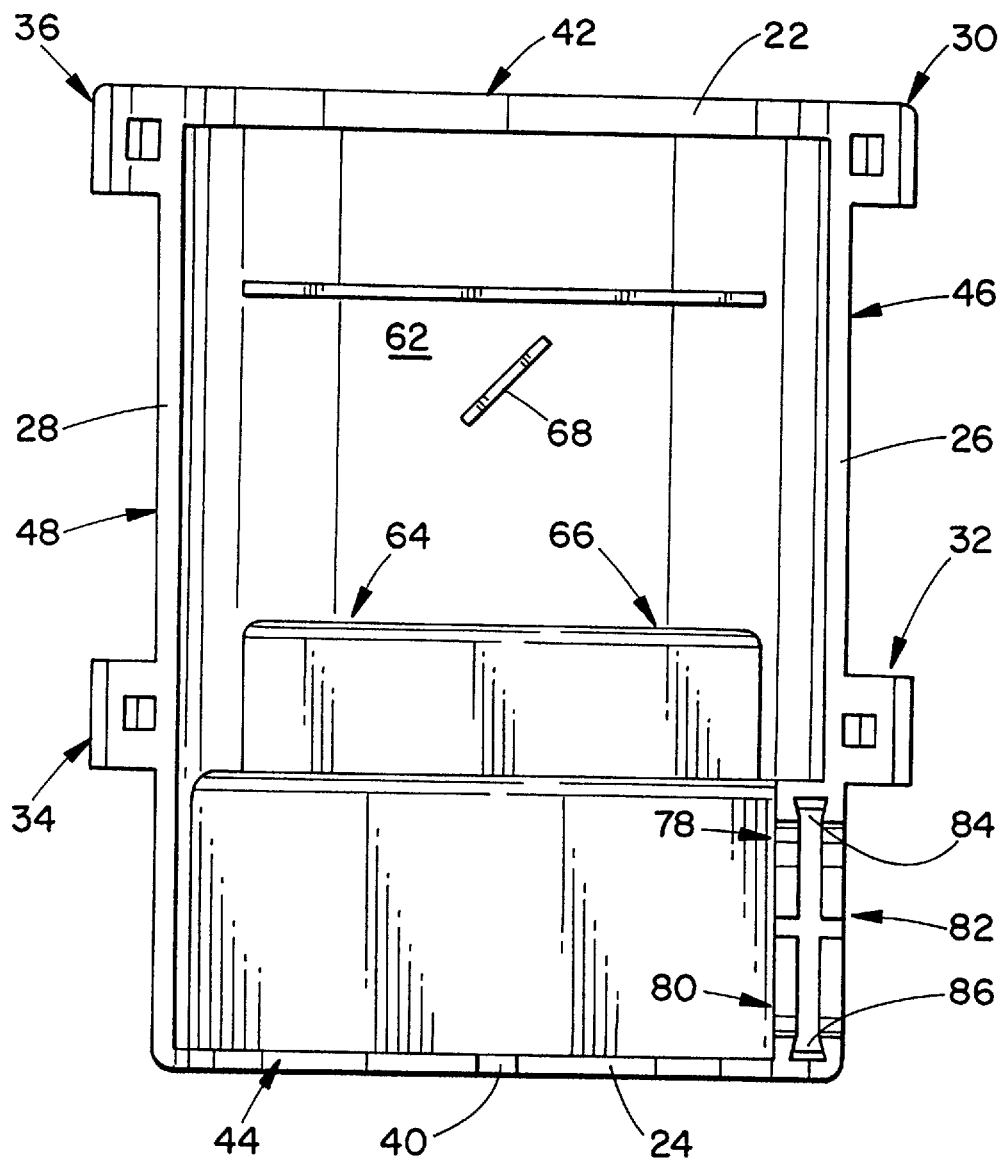
FIG. 7 is a bottom elevational view of the conduit box of FIG. 2.
Figure 8:
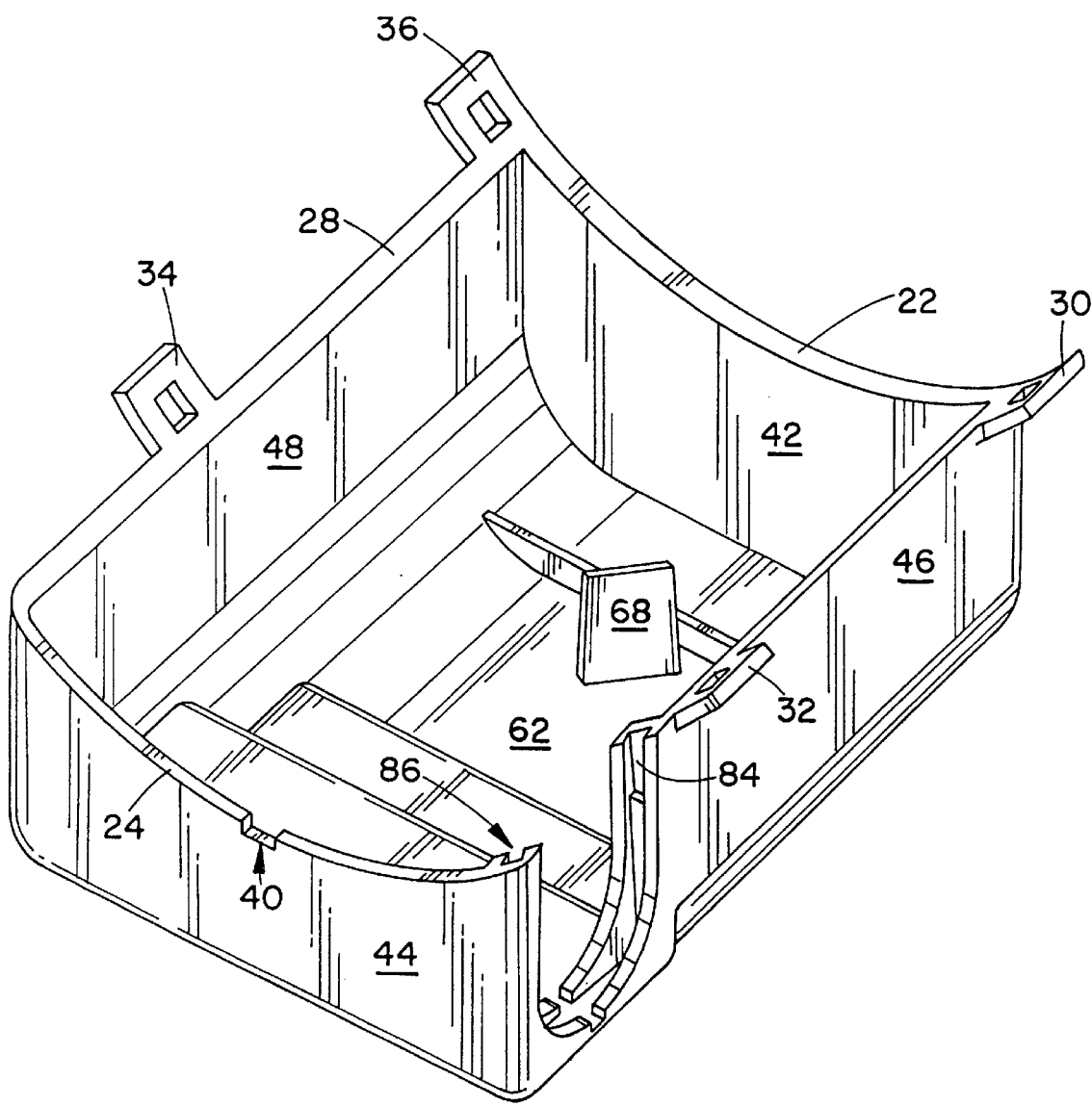
FIG. 8 is a bottom perspective view of the conduit box of FIG. 7.
Figure 9:
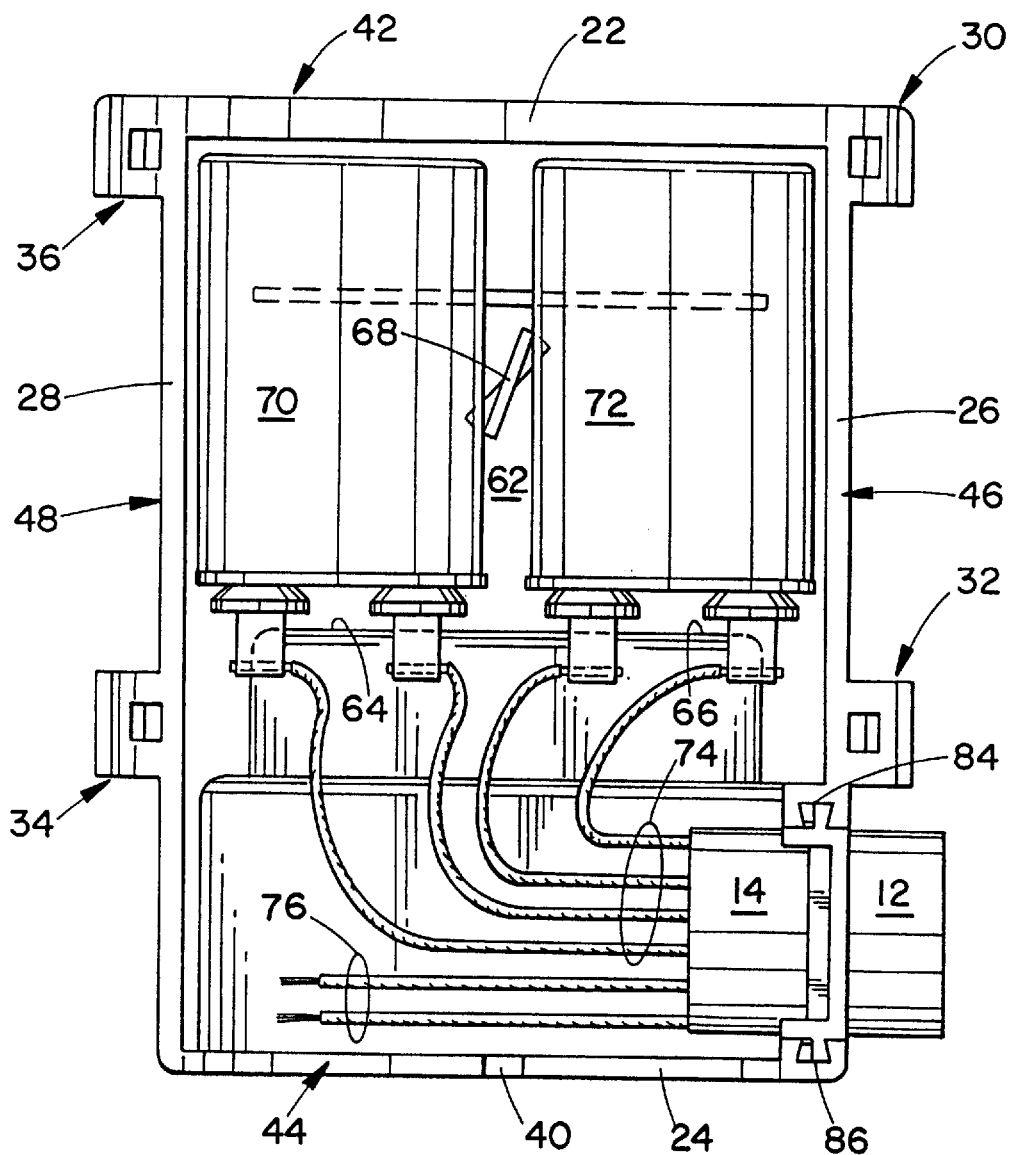
FIG. 9 is a bottom elevational view of the conduit box of FIG. 2 illustrating the invention in a completed subassembly condition.

Turning now to FIGS. 7–9, the conduit box 10 of the present invention is shown from the motor's view, or bottom, thereof illustrating the novel capacitor mounting capability of the box. The underside of the substantially flat rectangular top 60 forms a substantially planar deck surface 62 as illustrated. Extending perpendicularly from the deck surface are a pair of capacitor locating tabs 64, 66 and a single torsional spring 68. The capacitor locating tabs 64, 66 and the torsional spring 68 are formed as part of the conduit box 10 and are therefor constructed of the same material as the box, preferably a resilient plastic. As shown in FIG. 9, each of the capacitor locating tabs 64, 66 serves to respectively engage the top outer lip of a capacitor 70, 72 while the first sidewall 42 engages the bottom outer lip of the capacitors 70, 72. The third sidewall 46 engages the outer side of the second capacitor 72 along its length while the fourth sidewall 48 engages the outer side of the first capacitor 70 as shown. In that manner, the capacitor locating tabs 64, 66 and the first, third and fourth sidewalls cooperate together and with the torsional spring 68 to snugly house the pair of capacitors 70, 72 within the conduit box 10.

With continued references to FIGS. 7–9, the torsional spring 68 is used during the process of manufacturing the motor to capture the capacitors 70, 72 within the conduit box 10 and hold the capacitors in place without the need for complicated mechanisms, glues, taping or the like. The torsional spring 68 is resiliently compliant because it is formed of the same plastic material as the rest of the conduit box. The force exerted by the spring on the capacitors is based in part on the construction of the spring member including its thickness and overall size. Accordingly, the thickness of the torsional spring is selected to apply just enough force to hold the capacitors in place during rough handling of the conduit box 10 but not enough force to damage the capacitors.

Essentially, the capacitor mounting capability relies on the friction between the capacitors and the sidewalls of the conduit box 10. As each of the capacitors are press-fitted in place, the torsional spring 68 twists from the position illustrated in FIGS. 7 and 8 to the orientation as illustrated in FIG. 9. Although the preferred embodiment uses only a single torsional spring, in certain applications it may be desirable to utilize additional torsional springs located between the capacitors or elsewhere within the conduit box for holding the capacitors in place.

Figure 10:
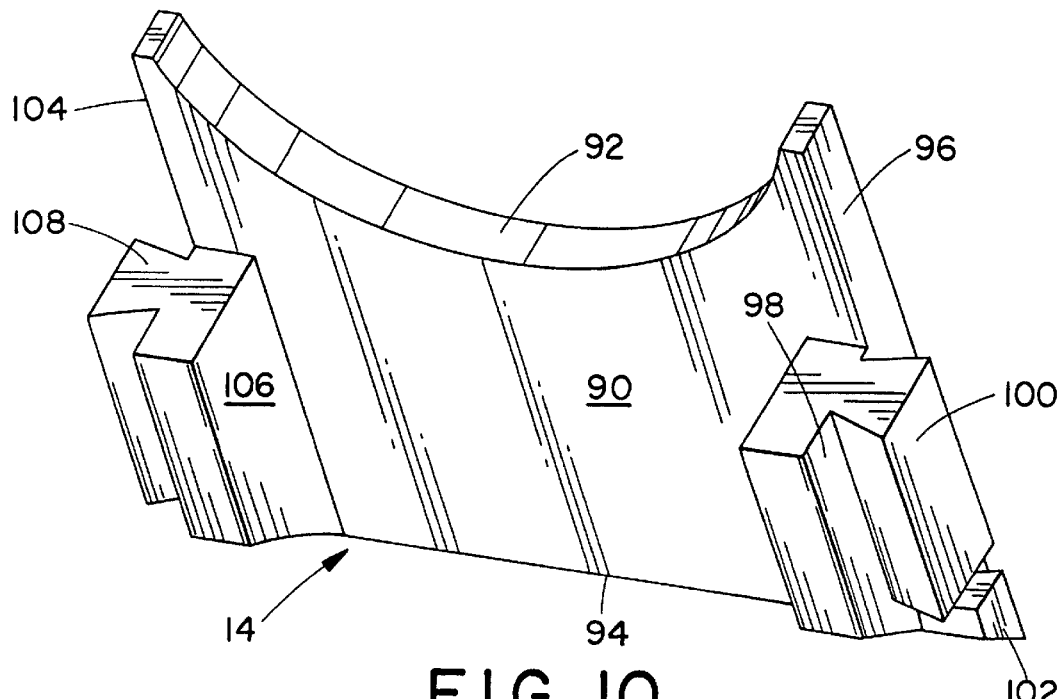
FIG. 10 is a perspective view of the connector locking member used with the conduit box according to the present invention.

After the capacitors are installed into their respective locations onto the deck surface 62 of the conduit box top 60, the capacitor and motor lead wires 74, 76 must be connected to the electrical connector 12. The present invention facilitates this next step in the manufacturing process in the form of a completed sub-assembly. In that regard, the third sidewall 46 has a connector receiving appature 82 formed therein for receiving the connector 12 and the connector locking member 14 best shown in FIGS. 10 through 12. The connector receiving appature is substantially rectangular and defined on either side by a pair of vertical edges 78, 80. A single groove 84, 86 is formed in each of the edges 78, 80, respectively. The grooves 84, 86 are trapizoidal in cross section and extend along the entire length of the edges 78, 80 in order to accommodate the electrical connector 12 and the connector locking member 14 in the receiving appature 82.

As with the torsional spring 68 for the purposes of holding the capacitors within the conduit box during rough handling and assembly, the connector locking member 14 is adapted to hold the electrical connector 12 in place within the receiving appature 82. The connector locking member 14 includes a substantially planar main body portion 90 having a curved top edge 92 and a tapered bottom edge 94. The shape of the curved top edge 92 is adapted to engage the bottom surface of the electrical connector 12 when both parts are received into the grooves of the appature 82. The tapered bottom edge 94 is "chisel shaped" to substantially match the construction of the first side edge 26 of the third sidewall 46 to maintain the integrity of the water resistant interface between the conduit box and the rounded motor casing 16.

The right vertical edge 96 of the locking member 14 includes a reinforcement member 98, a guide tab 100 and a friction locking tab 102. Similarly, the left vertical edge 104 of the locking member 14 includes a reinforcement member 106, a guide tab 108 and a friction locking tab 110. Each of the guide tabs 100, 108 is substantially trapezoidal in cross section and each is thereby adapted to snugly engage and slide within the grooves 84, 86 formed along vertical edges 78, 80 of the received appature 82.

Figure 11:
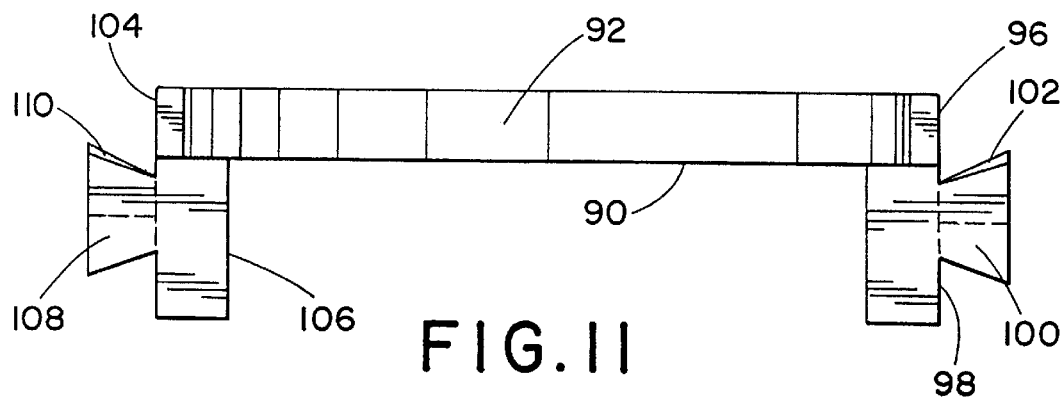
FIG. 11 is a top perspective view of the connector locking member of FIG. 9; and, FIG. 12 is a perspective view of a prior art multipin connector.

As best shown in FIG. 11, the friction locking tabs 102, 110 are formed on the body portion 90 in a slightly offset orientation. That is, the friction locking tabs are intentionally misaligned with the guide tabs 100, 108 in order to create a frictional holding force in the grooves 84, 86 when the locking member 14 is disposed therein. As the locking member 14 is slid into the grooves 84, 86 of the receiving appature 82, the "dovetail" frictional locking tabs 102, 110 are biased away from their original orientation and thus flex or bend within the grooves creating a frictional force within the grooves 84, 86.

Figure 12:
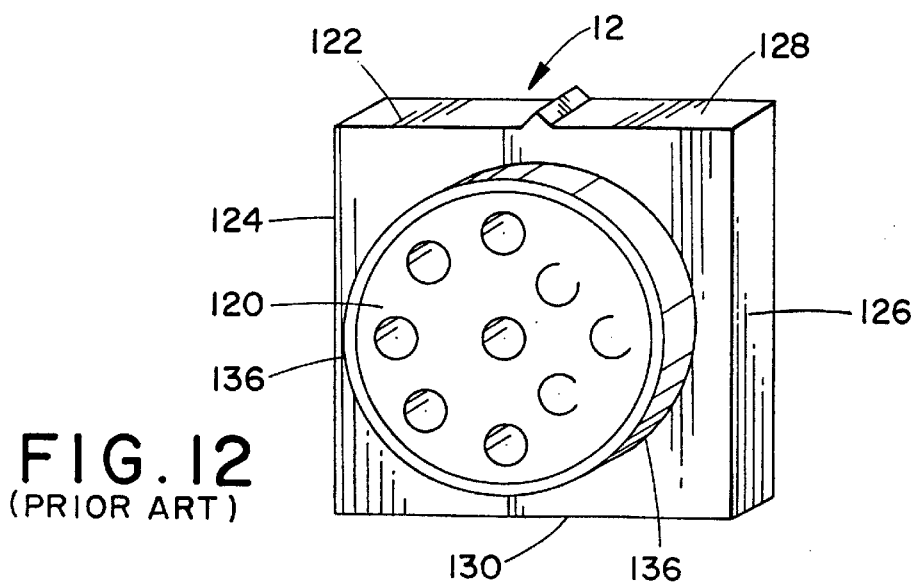

The electrical connector 12 used in connection with the present invention is best illustrated in FIG. 12. Essentially, the connector is a multi-pin variety of the type manufactured by Deutsch. The connector 12 includes a generally cylindrical body portion 120 and a planar peripheral portion 122. The peripheral portion 122 generally bisects the body portion 120 as illustrated and includes left, right, top and bottom edges 124–130. The left edge 124 is adapted to engage the third sidewall 46 and slide within the groove 86. Similarly, the right edge 126 is adapted to engage the third sidewall 46 and slide within the groove 84. The top edge 128 includes a molded keyway 132 adapted to engage a corresponding recess 134 formed in the third sidewall 46. In that manner, proper orientation of the connector is ensured. Lastly, the curved top edge 92 of the locking number 14 described above is contoured to match the radius of the cylindrical body portion 120 of the connector 12. Thus, the curved top edge 92 engages a curved surface area 136 of the connector when the connector and locking member are assembled as part of the terminal box 10.

As indicated above, it is an advantage of the invention to facilitate the process of electric motor manufacture. In that regard, a first sub-assembly is preferably created by mounting the pair of capacitors 70,72 to the box 10 using the torsional spring 68. Next, a second sub-assembly is fashioned by sliding the connector 12 into the grooves 84,86 of the receiving aperture 82. The locking member 14 is next inserted into the grooves 84,86 to lock the connector in place. Electrical connections between the capacitors 70,76 and certain pins of the connector 12 are next established by attachment of the capacitor lead wires 74 resulting in a completed sub-assembly. The final step is to connect the motor lead wires 78 from the connector to the motor coils and then the terminal box 10 to the motor casing 16.

While the particular preferred embodiments of the present invention has been shown and described in detail above, it should be clear that changes and modifications may be made to such embodiment without departing from the true scope and spirit of the invention. It is intended that the appended claims cover all such changes and modifications.

Having thus described the invention, we now claim:

1. A terminal box for mounting directly onto a generally cylindrical surface of an electrical motor housing and housing a pair of capacitors, the terminal box comprising:
   a generally rectangular unitary body member adapted to receive the pair of capacitors therein and having a
   i) a substantially planar deck surface,
   ii) a first pair of substantially rectangular opposing sidewalls; and
   iii) a second pair of opposing sidewalls, the second pair of sidewalls having a curved bottom edge contoured to conform to the curved surface of the electrical motor housing; and
   a spring member adapted to engage the pair of capacitors and hold the pair of capacitors in place within the terminal box regardless of the orientation of the terminal box.

2. The terminal box according to claim 1 wherein said spring member is disposed on said planar deck surface.

3. The terminal box according to claim 2 wherein said spring member is a torsional spring disposed on said planer deck surface.

4. The terminal box according to claim 3 wherein said spring member is formed integrally with said body member.

5. The terminal box according to claim 4 wherein said body member and said spring member are formed of a single injection molded plastic part.

6. The terminal box according to claim 1 wherein at least a first one of said second pair of opposing sidewalls includes a bead area along the curved bottom edge thereof and at least a second one of said second pair of opposing sidewalls includes a moisture drainage aperture for providing a moisture egress pathway from the terminal box.

7. The terminal box according to claim 6 wherein said bead area is formed integrally with said body member.

8. The terminal box according to claim 7 wherein said body member and said bead area are formed of a single injection molded plastic part.

9. The terminal box according to claim 6 wherein said spring member and said bead area are formed integrally with said body member.

10. The terminal box according to claim 9 wherein said body member, said spring member, and said bead area are formed of a single injection molded plastic part.

11. The terminal box according to claim 1 wherein a first one of said first pair of opposing sidewalls includes an electrical connector accommodating opening adapted to receive an operatively associated electrical connector, the electrical connector accommodating opening comprising a substantially rectangular aperture and a pair of slots formed on opposing sides of said aperture in said first one of the first pair of opposing sidewalls, the slots being adapted to slidably receive the operatively associated electrical connector therein.

12. The terminal box according to claim 11 further comprising a connector locking member slidably receivable in said slots for frictionally holding said electrical connector in place in said opening regardless of the orientation of the terminal box.

13. The terminal box according to claim 1 wherein at least a first one of said first pair of opposing sidewalls and said second pair of opposing sidewalls includes a bead area integrally formed on bottom edges thereof.

14. The terminal box according to claim 1 wherein at least a first one of said first pair of opposing sidewalls and said second pair of opposing sidewalls includes a moisture drainage aperture formed therein for providing a moisture egress pathway from the terminal box.

15. A method of assembling a split capacitor electric motor of the type including a pair of capacitors, motor coils and lead wires connected to the pair of capacitors and to the motor coils, the method comprising the steps of:
   i) providing a motor terminal box sub-assembly by:
      mounting the pair of capacitors to a housing structure to form a first sub-assembly;
      providing an electrical connector on the housing structure to form a second sub-assembly;
      connecting a first set of lead wires to at least a one of said pair of capacitors and a second set of lead wires to the other one of said pair of capacitors to form a third sub-assembly;
      connecting said first set of lead wires to said electrical connector as the motor terminal box sub-assembly;
   ii) providing a motor; and, iii) forming the split capacitor electric motor by:
   connecting said second set of lead wires from the motor terminal box sub-assembly to the lead wires of said motor; and,
   mounting the motor terminal box sub-assembly to said electric motor.

16. A unitary terminal box for mounting directly onto a generally cylindrical surface of an electric motor housing and housing a pair of capacitors, the terminal box comprising:
   a generally rectangular unitary body member formed of a single piece of material, the body member being adapted to receive the pair of capacitors therein and having a
      i) a substantially planar deck surface,
      ii) a first pair of substantially rectangular opposing sidewalls; and
      iii) a second pair of opposing sidewalls, the second pair of sidewalls having a curved bottom edge adapted to conform to the curved surface of the electric motor housing; and,
   a bead area integrally formed on the curved bottom edge of at least a one of said second pair of opposing sidewalls.

17. The unitary terminal box according to claim 16 further comprising a fastening member connected to the body member, the fastening member being adapted to engage the pair of capacitors and hold the pair of capacitors in place within the terminal box.

18. The unitary terminal box according to claim 17 wherein the body member, the fastening member, and the bead area are formed of a single plastic part.

19. The unitary terminal box according to claim 18 further comprising at least one moisture drainage aperture formed on a second one of said second pair of opposing sidewalls.

20. The terminal box according to claim 17 wherein a first one of said first pair of opposing sidewalls includes an electrical connector accommodating opening adapted to receive an operatively associated electrical connector, the electrical connector accommodating opening comprising a substantially rectangular aperture, a recess adapted to engage the operatively associated electrical connector, and a pair of slots formed on opposing sides of said aperture in said first one of the first pair of opposing sidewalls, the slots being adapted to slidably receive the operatively associated electrical connector therein.

* * * * *